United States Patent
Guevara et al.

(10) Patent No.: US 10,930,269 B2
(45) Date of Patent: Feb. 23, 2021

(54) END-TO-END STREAMING KEYWORD SPOTTING

(71) Applicant: Google LLC, Mountain View, CA (US)

(72) Inventors: Raziel Alvarez Guevara, Menlo Park, CA (US); Hyun Jin Park, Mountain View, CA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 16/439,897

(22) Filed: Jun. 13, 2019

(65) Prior Publication Data

US 2020/0020322 A1 Jan. 16, 2020

Related U.S. Application Data

(60) Provisional application No. 62/697,586, filed on Jul. 13, 2018.

(51) Int. Cl.
  *G10L 15/16* (2006.01)
  *G10L 15/02* (2006.01)
  (Continued)

(52) U.S. Cl.
  CPC .............. *G10L 15/16* (2013.01); *G10L 15/02* (2013.01); *G10L 15/063* (2013.01); *G10L 15/22* (2013.01);
  (Continued)

(58) Field of Classification Search
  CPC ....... G10L 15/16; G10L 15/02; G10L 15/063; G10L 15/22; G10L 2015/223; G10L 2015/088; G10L 2015/025
  See application file for complete search history.

(56) References Cited

U.S. PATENT DOCUMENTS 9,767,410 B1  9/2017 Guevara et al.
9,990,922 B2  6/2018 Foerster et al.
(Continued)

FOREIGN PATENT DOCUMENTS

KR  20160111795 A  9/2016

OTHER PUBLICATIONS

Preetum Nakkiran et al: "Compressing Deep Neural Networks using a Rank-Constrained Topology", Jan. 1, 2015 (Jan. 1, 2015), pp. 1473-1477, XP055604868, Retrieved from the Internet: URL:https:// static.googleusercontent.com/media/research.google.com/en//pubs/ archive/43813.pdf [retrieved on Jul. 11, 2019].
(Continued)

*Primary Examiner* — Michael Colucci
(74) *Attorney, Agent, or Firm* — Honigman LLP; Brett A. Krueger

(57) ABSTRACT

A method for detecting a hotword includes receiving a sequence of input frames that characterize streaming audio captured by a user device and generating a probability score indicating a presence of a hotword in the streaming audio using a memorized neural network. The network includes sequentially-stacked single value decomposition filter (SVDF) layers and each SVDF layer includes at least one neuron. Each neuron includes a respective memory component, a first stage configured to perform filtering on audio features of each input frame individually and output to the memory component, and a second stage configured to perform filtering on all the filtered audio features residing in the respective memory component. The method also includes determining whether the probability score satisfies a hotword detection threshold and initiating a wake-up process on the user device for processing additional terms.

24 Claims, 10 Drawing Sheets

(51) Int. Cl.
 G10L 15/06 (2013.01)
 G10L 15/22 (2006.01)
 G10L 15/08 (2006.01)

(52) U.S. Cl.
 CPC .. *G10L 2015/025* (2013.01); *G10L 2015/088* (2013.01); *G10L 2015/223* (2013.01)

(56) References Cited

U.S. PATENT DOCUMENTS

| | | | |
|---|---|---|---|
| 10,460,729 B1 * | 10/2019 | Sun | G10L 15/16 |
| 2003/0200097 A1 * | 10/2003 | Brand | G06F 17/16 704/500 |
| 2016/0162586 A1 * | 6/2016 | Maxwell | H04W 4/21 707/733 |
| 2017/0154620 A1 | 6/2017 | Berthelsen et al. | |
| 2017/0213321 A1 * | 7/2017 | Matviychuk | G06K 9/6215 |
| 2018/0047272 A1 * | 2/2018 | Chandraker | G08B 21/0205 |
| 2018/0130469 A1 | 5/2018 | Gruenstein et al. | |
| 2018/0174037 A1 * | 6/2018 | Henry | G06F 16/325 |
| 2018/0182397 A1 | 6/2018 | Carbune et al. | |
| 2019/0228311 A1 * | 7/2019 | Sarah | G06N 3/063 |

OTHER PUBLICATIONS

International Search report for the related application No. PCT/US2019/036907 dated Nov. 19, 2019.

* cited by examiner

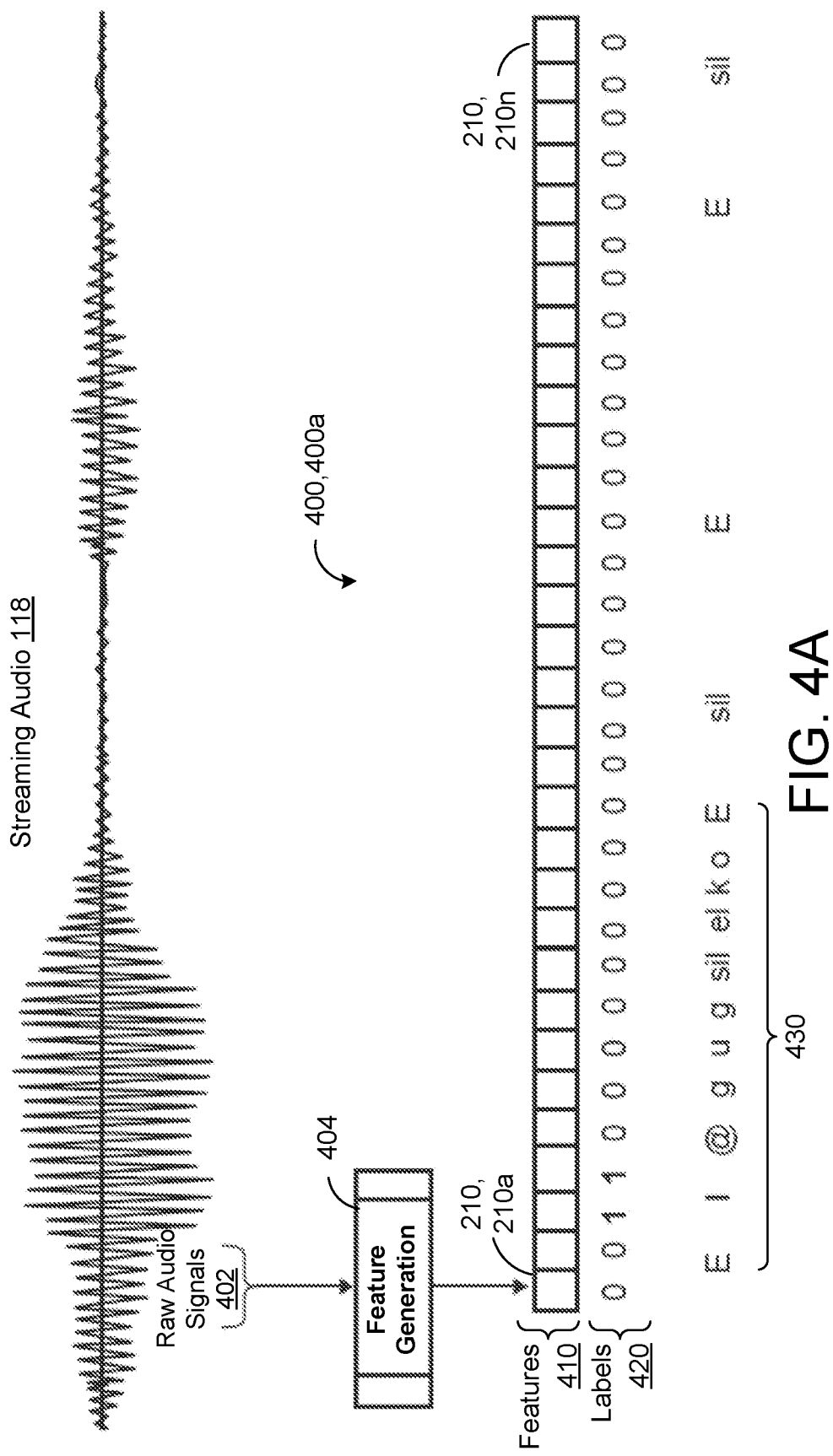

END-TO-END STREAMING KEYWORD SPOTTING

CROSS REFERENCE TO RELATED APPLICATIONS

This U.S. patent application claims priority under 35 U.S.C. § 119(e) to U.S. Provisional Application 62/697,586, filed on Jul. 13, 2018. The disclosure of this prior application is considered part of the disclosure of this application and is hereby incorporated by reference in its entirety.

TECHNICAL FIELD

This disclosure relates to an end-to-end system for spotting keywords in streaming audio.

BACKGROUND

A speech-enabled environment (e.g., home, workplace, school, automobile, etc.) allows a user to speak a query or a command out loud to a computer-based system that fields and answers the query and/or performs a function based on the command. The speech-enabled environment can be implemented using a network of connected microphone devices distributed through various rooms or areas of the environment. These devices may use hotwords to help discern when a given utterance is directed at the system, as opposed to an utterance that is directed to another individual present in the environment. Accordingly, the devices may operate in a sleep state or a hibernation state and wake-up only when a detected utterance includes a hotword. Neural networks have recently emerged as an attractive solution for training models to detect hotwords spoken by users in streaming audio. Typically, systems used to detect hotwords in streaming audio include a signal processing front end component, a neural network acoustic encoder component, and a hand-designed decoder component. These components are generally trained independent from one another, thereby creating added complexities and is suboptimal compared to training all components jointly.

SUMMARY

One aspect of the disclosure provides a method for detecting a hotword in streaming audio. The method includes, receiving, at data processing hardware of a user device, a sequence of input frames that each include respective audio features characterizing streaming audio captured by the user device, and generating, by the data processing hardware, a probability score indicating a presence of the hotword in the streaming audio using a memorized neural network. The memorized neural network includes sequentially-stacked single value decomposition filter (SVDF) layers, wherein each SVDF layer includes at least one neuron. Each neuron includes a respective memory component, a first stage, and a second stage. The respective memory component is associated with a respective memory capacity of the corresponding neuron. The first stage is configured to perform filtering on the respective audio features of each input frame individually and output the filtered audio features to the respective memory component. The second stage is configured to perform filtering on all the filtered audio features residing in the respective memory component. The method also includes determining, by the data processing hardware, whether the probability score satisfies a hotword detection threshold, and when the probability score satisfies the hotword detection threshold, initiating, by the data processing hardware, a wake-up process on the user device for processing the hotword and/or one or more other terms following the hotword in the audio stream.

Implementations of the disclosure may include one or more of the following optional features. In some implementations, a sum of the memory capacities associated with the respective memory components for a neuron from each of the SVDF layers provide the memorized neural network with a fixed memory capacity proportional to a length of time a typical speaker takes to speak the hotword. In some examples, the respective memory capacity associated with at least one of the respective memory components is different than the respective memory capacities associated with the remaining memory components. In other examples, the respective memory capacities associated with the respective memory components of all the SVDF layers is the same.

In some examples, a remote system trains the memorized neural network on a plurality of training input audio sequences. In these examples, each training input audio sequence includes: a sequence of input frames that each include one or more respective audio features characterizing phonetic components of the hotword; and labels assigned to the input frames, each label indicating a probability that the audio features of a respective input frame include a phonetic component of the hotword. In some configurations, training the memorized neural network includes, for each training input audio sequence: training an encoder portion by assigning a first label to a portion of the input frames that include a phonetic component of the hotword and assigning a second label to a remaining portion of the input frames that include phonetic components of the hotword; and training a decoder portion by applying a label indicating that the corresponding training input audio sequence either includes the hotword or does not include the hotword. Here, assigning the first label to the portion of the input audio frames may include: assigning the first label to at least one input frame that includes one or more respective audio features characterizing a last phonetic component of the hotword; and assigning the second label to the remaining input frames each including one or more respective audio features characterizing the remaining phonetic components of the hotword. In other configurations, training the memorized neural network includes, for each training input audio sequence: during a first stage of training, pre-training an encoder portion by assigning the labels to the input frames for the corresponding training input audio sequence; and during a second stage of training, initializing the encoder portion with the assigned labels from the first stage of training and training a decoder portion with outputs from the encoder portion to either detect the hotword or not detect the hotword.

The memorized neural network may include at least one additional processing layer disposed between adjacent SVDF layers. The memorized neural network includes at least one bottlenecking layer disposed between adjacent SVDF layers. In some examples the duio features of each input frame include log-filterbanks. For instance, each input frame may include forty log-filterbanks.

Another aspect of the disclosure provides a system for detecting audio in streaming audio. The system includes data processing hardware of a user device and memory hardware in communication with the data processing hardware and storing instructions that when executed by the data processing hardware cause the data processing hardware to perform operations. The operations include receiving a sequence of input frames that each include respective audio features characterizing streaming audio captured by the user device, and generating a probability score indicating a presence of the hotword in the streaming audio using a memorized neural network. The memorized neural network includes sequentially-stacked single value decomposition filter (SVDF) layers, wherein each SVDF layer includes at least one neuron. Each neuron includes a respective memory component, a first stage, and a second stage. The respective memory component is associated with a respective memory capacity of the corresponding neuron. The first stage is configured to perform filtering on the respective audio features of each input frame individually and output the filtered audio features to the respective memory component. The second stage is configured to perform filtering on all the filtered audio features residing in the respective memory component. The operations also include determining whether the probability score satisfies a hotword detection threshold, and when the probability score satisfies the hotword detection threshold, initiating a wake-up process on the user device for processing the hotword and/or one or more other terms following the hotword in the audio stream.

This aspect may include one or more of the following optional features. In some implementations, a sum of the memory capacities associated with the respective memory components for a neuron from each of the SVDF layers provide the memorized neural network with a fixed memory capacity proportional to a length of time a typical speaker takes to speak the hotword. In some examples, the respective memory capacity associated with at least one of the respective memory components is different than the respective memory capacities associated with the remaining memory components. In other examples, the respective memory capacities associated with the respective memory components of all the SVDF layers is the same.

In some examples, a remote system trains the memorized neural network on a plurality of training input audio sequences. In these examples, each training input audio sequence includes: a sequence of input frames that each include one or more respective audio features characterizing phonetic components of the hotword; and labels assigned to the input frames, each label indicating a probability that the audio features of a respective input frame include a phonetic component of the hotword. In some configurations, training the memorized neural network includes, for each training input audio sequence: training an encoder portion by assigning a first label to a portion of the input frames that include a phonetic component of the hotword and assigning a second label to a remaining portion of the input frames that include phonetic components of the hotword; and training a decoder portion by applying a label indicating that the corresponding training input audio sequence either includes the hotword or does not include the hotword. Here, assigning the first label to the portion of the input audio frames may include: assigning the first label to at least one input frame that includes one or more respective audio features characterizing a last phonetic component of the hotword; and assigning the second label to the remaining input frames each including one or more respective audio features characterizing the remaining phonetic components of the hotword. In other configurations, training the memorized neural network includes, for each training input audio sequence: during a first stage of training, pre-training an encoder portion by assigning the labels to the input frames for the corresponding training input audio sequence; and during a second stage of training, initializing the encoder portion with the assigned labels from the first stage of training and training a decoder portion with outputs from the encoder portion to either detect the hotword or not detect the hotword.

The memorized neural network may include at least one additional processing layer disposed between adjacent SVDF layers. The memorized neural network includes at least one bottlenecking layer disposed between adjacent SVDF layers. In some examples the duio features of each input frame include log-filterbanks. For instance, each input frame may include forty log-filterbanks.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A and 4B are schematic views showing audio feature-label pairs generated from streaming audio for training neural networks.

Like reference symbols in the various drawings indicate like elements.

DETAILED DESCRIPTION

Figure 1:
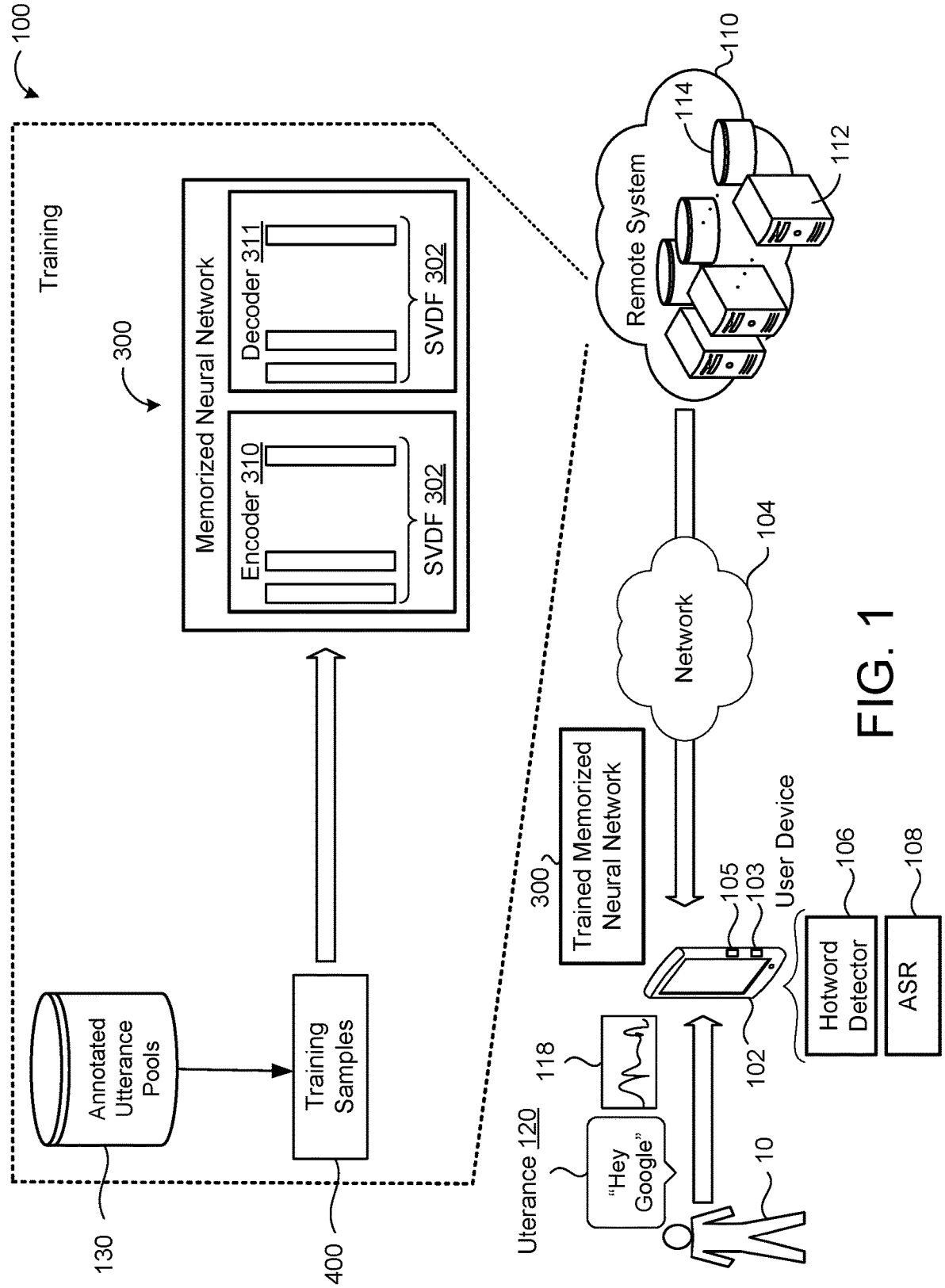
FIG. 1 is a schematic view of an example system for training a memorized neural network and using the trained memorized neural network to detect a hotword in a spoken utterance.

A voice-enabled device (e.g., a user device executing a voice assistant) allows a user to speak a query or a command out loud and field and answer the query and/or perform a function based on the command. Through the use of a "hotword" (also referred to as a "keyword", "attention word", "wake-up phrase/word", "trigger phrase", or "voice action initiation command"), in which by agreement a predetermined term/phrase that is spoken to invoke attention for the voice enabled device is reserved, the voice enabled device is able to discern between utterances directed to the system (i.e., to initiate a wake-up process for processing one or more terms following the hotword in the utterance) and utterances directed to an individual in the environment. Typically, the voice-enabled device operates in a sleep state to conserve battery power and does not process input audio data unless the input audio data follows a spoken hotword. For instance, while in the sleep state, the voice-enabled device captures input audio via a microphone and uses a hotword detector trained to detect the presence of the hotword in the input audio. When the hotword is detected in the input audio, the voice-enabled device initiates a wake-up process for processing the hotword and/or any other terms in the input audio following the hotword.

Hotword detection is analogous to searching for a needle in a haystack because the hotword detector must continuously listen to streaming audio, and trigger correctly and instantly when the presence of the hotword is detected in the streaming audio. In other words, the hotword detector is tasked with ignoring streaming audio unless the presence of the hotword is detected. Neural networks are commonly employed by hotword detectors to address the complexity of detecting the presence of a hotword in a continuous stream of audio. A hotword detector typically includes three main components: a signal processing frontend; a neural network acoustic encoder; and a hand-designed decoder. The signal processing frontend may convert raw audio signals captured by the microphone of the user device into one or more audio features formatted for processing by the neural network acoustic encoder component. For instance, the neural network acoustic encoder component may convert these audio features into phonemes and the hand-designed decoder uses a hand-coded algorithm to stitch the phonemes together to provide a probability of whether or not an audio sequence includes the hotword. Typically, these three components are trained and/or manually designed independently from one another, thereby creating added complexity and loss in efficiency during training compared to training all the components jointly. Moreover, deploying models composed of independently trained models consume additional resource requirements (e.g., processing speeds and memory consumption). Separate models are often required for detecting different hotwords, as well as for detecting the same hotword in different locals. For example, an English speaker in South Africa may pronounce the phrase "Ok Google" differently than an English speaker in the United States that is located in North Dakota.

Implementations herein are directed toward an end-to-end hotword spotting system (also referred to as a 'keyword spotting system') that trains both encoding and decoding components into a single memorized neural network to determine a probability of a presence of a designated hotword in streaming audio. This single memorized neural network may be trained to detect multiple hotwords, as well as detecting a same hotword spoken in different languages and/or different locals. Specifically, the memorized neural network refers to a neural network topology having an amount of fixed memory proportional to an amount of streaming audio the neural network wants to remember into the past. For instance, it may be desirable for the neural network to have only enough memory to remember an amount of streaming audio equivalent to the time a typical speaker takes to speak a designated hotword. In some implementations, the memorized neural network topology is a layered topology of Single Value Decomposition Filter (SVDF) layers, with each layer including one or more SVDF neurons. Each SVDF neuron of each layer includes a respective memory capacity and the memory capacities of all of the SVDF layers additively make-up the total fixed memory for the neural network to remember only a fixed length of time in the streaming audio that is necessary to capture audio features characterizing the hotword. Each neuron may also include an appropriate activation function (e.g., rectified linear). Additionally, as the output of each SVDF layer is an input to a subsequent SVDF layer, bottleneck layers may be disposed between one or more adjacent SVDF layers to scale the number of inputs fed to subsequent SVDF layers.

Referring to FIG. 1, in some implementations, an example system 100 includes one or more user devices 102 each associated with a respective user 10 and in communication with a remote system 110 via a network 104. Each user device 102 may correspond to a computing device, such as a mobile phone, computer, wearable device, smart appliance, smart speaker, etc., and is equipped with data processing hardware 103 and memory hardware 105. The remote system 110 may be a single computer, multiple computers, or a distributed system (e.g., a cloud environment) having scalable/elastic computing resources 112 (e.g., data processing hardware) and/or storage resources 114 (e.g., memory hardware). The user device 102 receives a trained memorized neural network 300 from the remote system 110 via the network 104 and executes the trained memorized neural network 300 to detect hotwords in streaming audio 118. The trained memorized neural network 300 may reside in a hotword detector 106 (also referred to as a hotworder) of the user device 102 that is configured to detect the presence of a hotword in streaming audio without performing semantic analysis or speech recognition processing on the streaming audio 118. Optionally, the trained memorized neural network 300 may additionally or alternatively reside in an automatic speech recognizer (ASR) 108 of the user device 102 and/or the remote system 110 to confirm that the hotword detector 106 correctly detected the presence of a hotword in streaming audio 118.

In some implementations, the data processing hardware 112 trains the memorized neural network 300 using training samples 400 obtained from annotated utterance pools 130. The annotated utterance pools 130 may reside on the memory hardware 114 and/or some other remote memory location(s). In the example shown, when the user 10 speaks an utterance 120 including a hotword (e.g., "Hey Google") captured as streaming audio 118 by the user device 102, the memorized neural network 300 executing on the user device 102 is configured to detect the presence of the hotword in the utterance 120 to initiate a wake-up process on the user device 102 for processing the hotword and/or one or more other terms (e.g., query or command) following the hotword in the utterance 120. In additional implementations, the user device 102 sends the utterance 120 to the remote system 110 for additional processing or verification (e.g., with another, potentially more computationally-intensive memorized neural network 300).

In the example shown, the memorized neural network 300 includes an encoder portion 310 and a decoder portion 311 each including a layered topology of single value decomposition filter (SVDF) layers 302. The SVDF layers 302 provide the memory for the neural network 300 by providing each SVDF layer 302 with a memory capacity such that the memory capacities of all of the SVDF layers 302 additively make-up the total fixed memory for the neural network 300 to remember only a fixed length of time in the streaming audio 118 necessary to capture audio features 410 (FIGS. 4A and 4B) that characterize the hotword.

Figure 2:
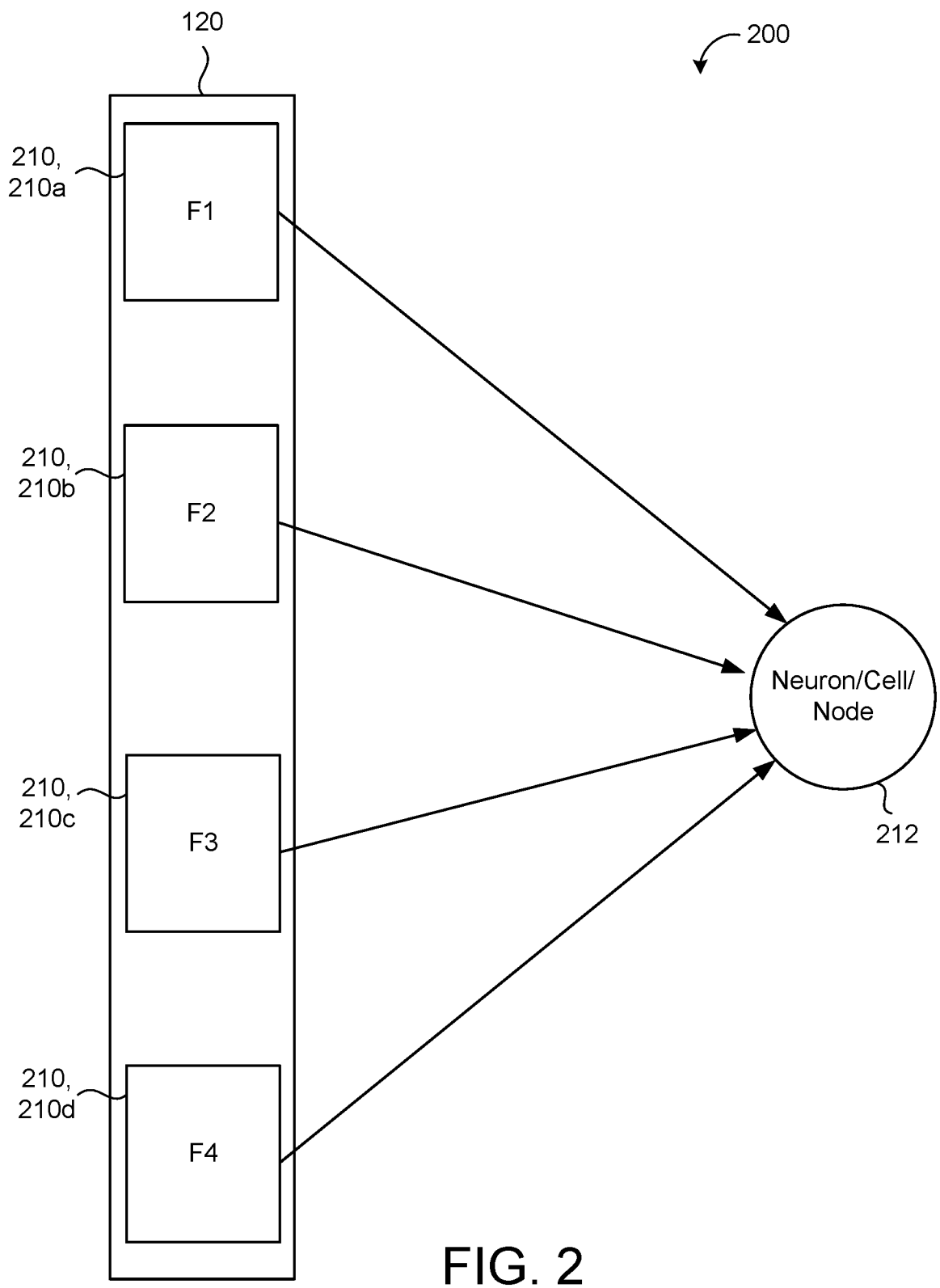
FIG. 2 is a schematic view of components of a typical neural network acoustic encoder used by models that detect hotwords.

Referring now to FIG. 2, a typical hotword detector uses a neural network acoustic encoder 200 without memory. Because the network 200 lacks memory, each neuron 212 of the acoustic encoder 200 must accept, as an input, every audio feature of every frame 210, 210a-d of a spoken utterance 120 simultaneously. Note that each frame 210 can have any number of audio features, each of which the neuron 212 accepts as an input. Such a configuration requires a neural network acoustic encoder 200 of substantial size that increases dramatically as the fixed length of time increases and/or the number of audio features increases. The output of the acoustic encoder 200 results in a probability of each, for example, phoneme of the hotword that has been detected. The acoustic encoder 200 must then rely on a hand-coded decoder to process the outputs of the acoustic encoder 200

(e.g., stitch together the phonemes) in order to generate a score (i.e., an estimation) indicating a presences of the hotword.

Figure 3A:
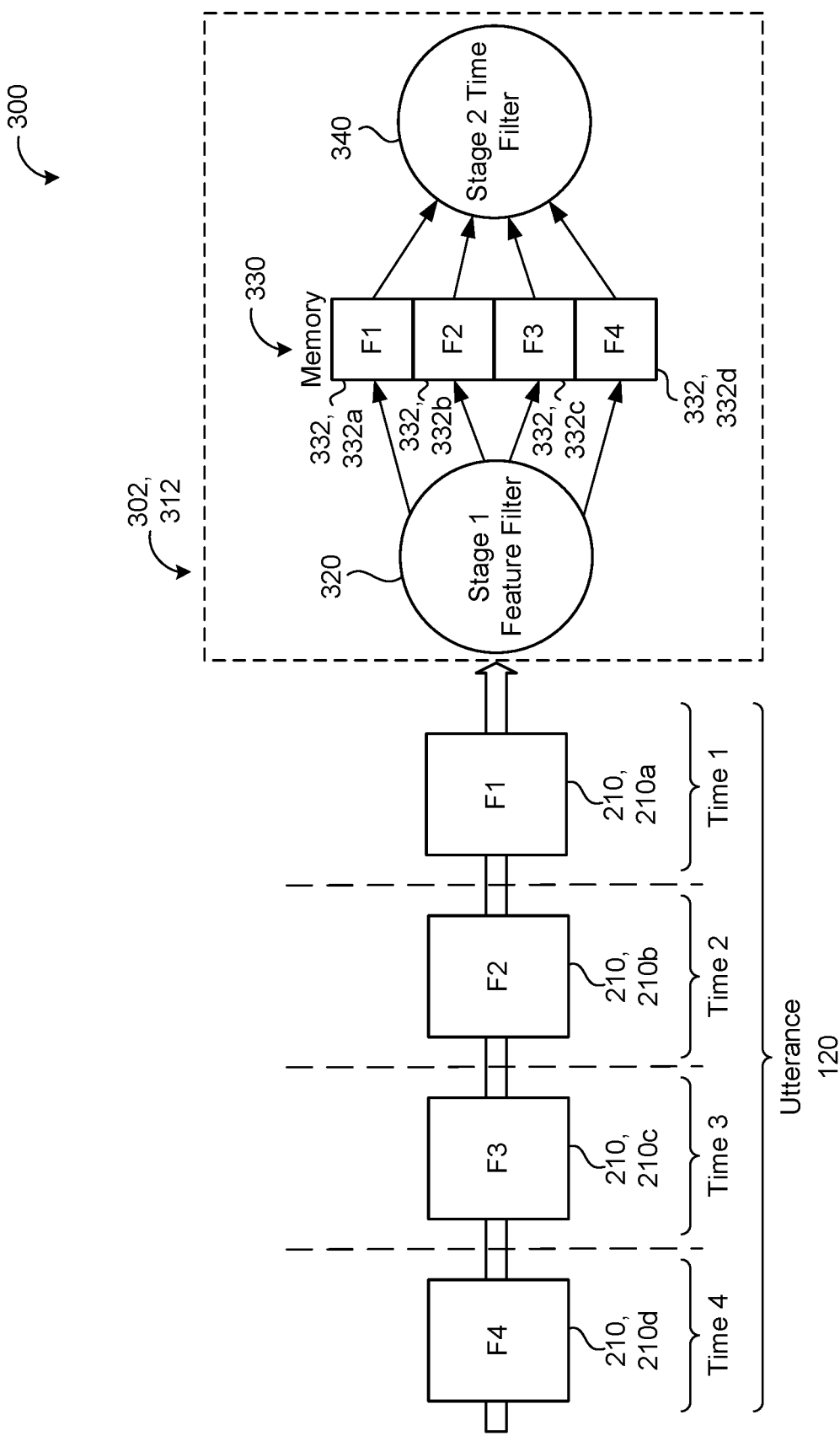
FIG. 3A is a schematic view of example components of the memorized neural network of the system of FIG. 1.
Figure 3B:
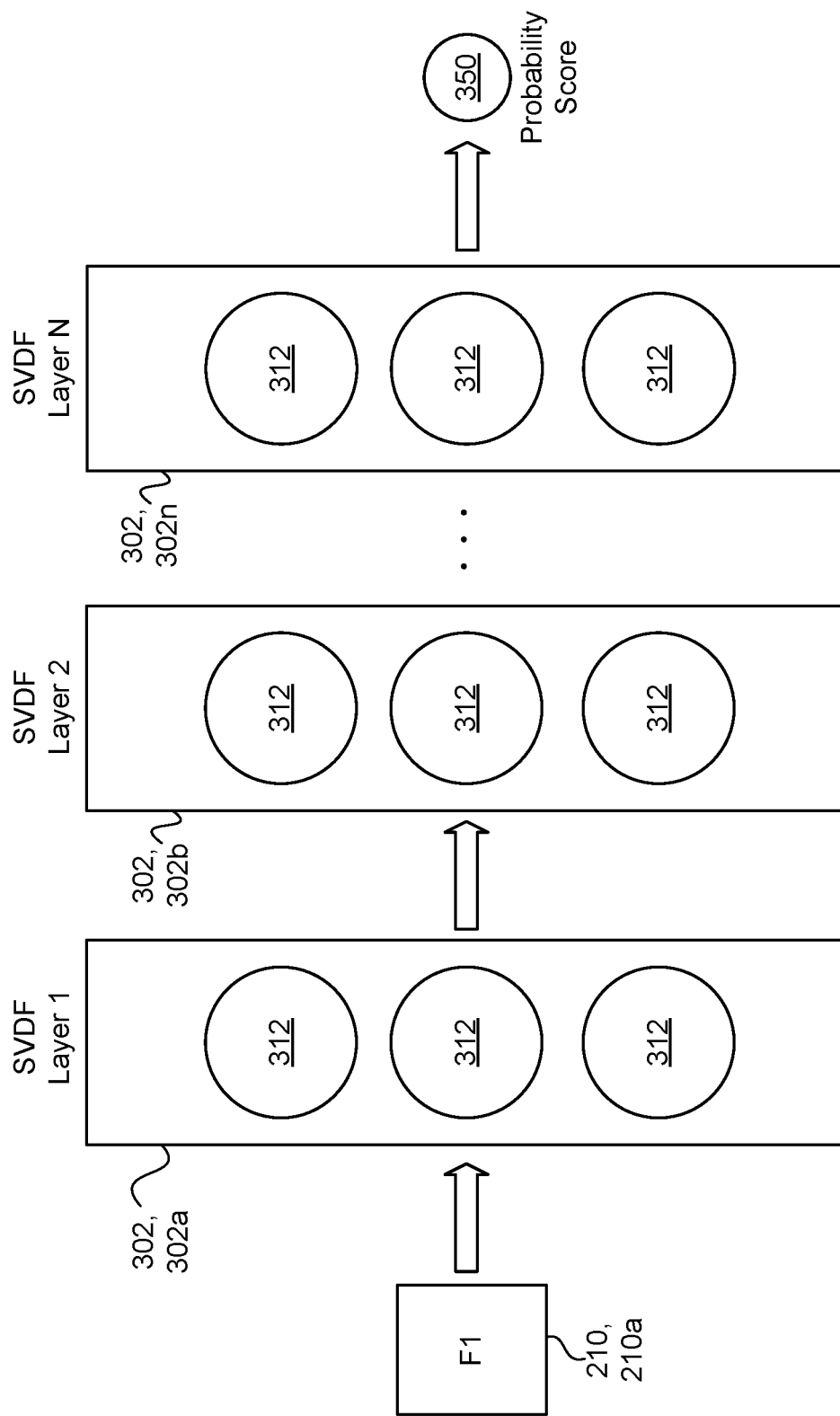
FIG. 3B is a schematic view of example components of a memorized neural network with multiple layers.

Referring now to FIGS. 3A and 3B, in some implementations, a single value decomposition filter (SVDF) neural network 300 (also referred to as a memorized neural network) has any number of neurons/nodes 312, where each neuron 312 accepts only a single frame 210, 210a-d of a spoken utterance 120 at a time. That is, if each frame 210, for example, constitutes 30 ms of audio data, a respective frame 210 is input to the neuron 312 approximately every 30 ms (i.e., Time 1, Time 2, Time 3, Time 4, etc.). FIG. 3A shows each neuron 312 including a two-stage filtering mechanism: a first stage 320 (i.e., Stage 1 Feature Filter) that performs filtering on a features dimension of the input and a second stage 340 (i.e., Stage 2 Time Filter) that performs filtering on a time dimension on the outputs of the first stage 320. Therefore, the stage 1 feature filter 320 performs feature filtering on only the current frame 210. The result of the processing is then placed in a memory component 330. The size of the memory component 330 is configurable per node or per layer level. After the stage 1 feature filter 320 processes a given frame 210 (e.g., by filtering audio features within the frame), the filtered result is placed in a next available memory location 332, 332a-d of the memory component 330. Once all memory locations 332 are filled, the stage 1 feature filter 320 will overwrite the memory location 332 storing the oldest filtered data in the memory component 330. Note that, for illustrative purposes, FIG. 3A shows a memory component 330 of size four (four memory locations 332a-d) and four frames 210a-d, but due to the nature of hotword detection, the system 100 will typically monitor streaming audio 118 continuously such that each neuron 312 will "slide" along or process frames 210 akin to a pipeline. Put another way, if each stage includes N feature filters 320 and N time filters 340 (each matching the size of the input feature frame 210), the layer is analogous to computing N×T (T equaling the number of frames 210 in a fixed period of time) convolutions of the feature filters by sliding each of the N filters 320, 340 on the input feature frames 210, with a stride the size of the feature frames. For example, since the example shows the memory component 330 at capacity after the stage 1 feature filter outputs the filtered audio features associated with Frame 4 (F4) 210d (during Time 4), the stage 1 feature filter 320 would place filtered audio features associated with following Frame 5 (F5) (during a Time 5) into memory 330 by overwriting the filtered audio features associated with Frame 1 (F1) 210a within memory location 332a. In this way, the stage 2 time filter 340 applies filtering to the previous T-1 (T again equaling the number of frames 210 in a fixed period of time) filtered audio features output from the stage 1 feature filter 320.

The stage 2 time filter 340 then filters each filtered audio feature stored in memory 330. For example, FIG. 3A shows the stage 2 time filter 340 filtering the audio features in each of the four memory locations 332 every time the stage 1 feature filter 320 stores a new filtered audio feature into memory 330. In this way, the stage 2 time filter 340 is always filtering a number of past frames 210, where the number is proportional to the size of the memory 330. Each neuron 312 is part of a single SVDF layer 302, and the neural network 300 may include any number of layers 302. The output of each stage 2 time filter 340 is passed to an input of a neuron 312 in the next layer 302. The number of layers 302 and the number of neurons 312 per layer 302 is fully configurable and is dependent upon available resources and desired size, power, and accuracy. This disclosure is not limited to the number of SVDF layers 302 nor the number of neurons 312 in each SVDF layer 302.

Referring now to FIG. 3B, each SVDF layer 302, 302a-n (or simply 'layer') of the neural network 300 is connected such that the outputs of the previous layer are accepted as inputs to the corresponding layer 302. In some examples, the final layer 302n outputs a probability score 350 indicating the probability that the utterance 120 includes the hotword.

In an SVDF network 300, the layer design derives from the concept that a densely connected layer 302 that is processing a sequence of input frames 210 can be approximated by using a singular value decomposition of each of its nodes 312. The approximation is configurable. For example, a rank R approximation signifies extending a new dimension R for the layer's filters: stage 1 occurs independently, and in stage 2, the outputs of all ranks get added up prior to passing through the non-linearity. In other words, an SVDF decomposition of the nodes 312 of a densely connected layer of matching dimensions can be used to initialize an SVDF layer 302, which provides a principled initialization and increases the quality of the layer's generalization. In essence, the "power" of a larger densely connected layer is transferred into a potentially (depending on the rank) much smaller SVDF. Note, however, the SVDF layer 302 does not need the initialization to outperform a densely connected or even convolutional layer with the same or even more operations.

Thus, implementations herein are directed toward a stateful, stackable neural network 300 where each neuron 312 of each SVDF layer 302 includes a first stage 320, associated with filtering audio features, and a second stage 340, associated with filtering outputs of the first stage 320 with respect to time. Specifically, the first stage 320 is configured to perform filtering on one or more audio features on one audio feature input frame 210 at a time and output the filtered audio features to the respective memory component 330. Here, the stage 1 feature filter 320 receives one or more audio features associated with a time frame 210 as input for processing and outputs the processed audio features into the respective memory component 330 of the SVDF layer 302. Thereafter, the second stage 340 is configured to perform filtering on all the filtered audio features output from the first stage 320 and residing in the respective memory component 330. For instance, when the respective memory component 330 is equal to eight (8), the second stage 340 would pull up to the last eight (8) filtered audio features residing in the memory component 330 that were output from the first stage 320 during individual filtering of the audio features within a sequence of eight (8) input frames 210. As the first stage 320 fills the corresponding memory component 330 to capacity, the memory locations 332 containing the oldest filtered audio features are overwritten (i.e., first in, first out). Thus, depending on the capacity of the memory component 330 at the SVDF neuron 312 or layer 302, the second stage 340 is capable of remembering a number of past outputs processed by the first stage 320 of the corresponding SVDF layer 302. Moreover, since the memory components 330 at the SVDF layers 302 are additive, the memory component 330 at each SVDF neuron 312 and layer 302 also includes the memory of each preceding SVDF neuron 312 and layer 302, thus extending the overall receptive field of the memorized neural network 300. For instance, in a neural network 300 topology with four SVDF layers 302, each having a single neuron 312 with a memory component 330 equal to eight (8), the last SVDF layer 302 will include a sequence of up to the last thirty-two (32) audio feature input frames 210 individually filtered by the neural network 300. Note, however, the amount of memory is configurable per layer 302 or even per node 312. For example, the first layer 302a may be allotted thirty-two (32) locations 332, while the last layer 302 may be configured with eight (8) locations 332. As a result, the stacked SVDF layers 302 allow the neural network 300 to process only the audio features for one input time frame 210 (e.g., 30 milliseconds of audio data) at a time and incorporate a number of filtered audio features into the past that capture the fixed length of time necessary to capture the designated hotword in the streaming audio 118. By contrast, a neural network 200 without memory (as shown in FIG. 2) would require its neurons 212 to process all of the audio feature frames covering the fixed length of time (e.g., 2 seconds of audio data) at once in order to determine the probability of the streaming audio including the presence of the hotword, which drastically increases the overall size of the network. Moreover, while recurrent neural networks (RNNs) using long short-term memory (LSTM) provide memory, RNN-LSTMs cause the neurons to continuously update their state after each processing instance, in effect having an infinite memory, and thereby prevent the ability to remember a finite past number of processed outputs where each new output re-writes over a previous output (once the fixed-sized memory is at capacity). Put another way, SVDF networks do not recur the outputs into the state (memory), nor rewrite all the state with each iteration; instead, the memory keeps each inference run's state isolated from subsequent runs, instead pushing and popping in new entries based on the memory size configured for the layer.

Figure 4B:
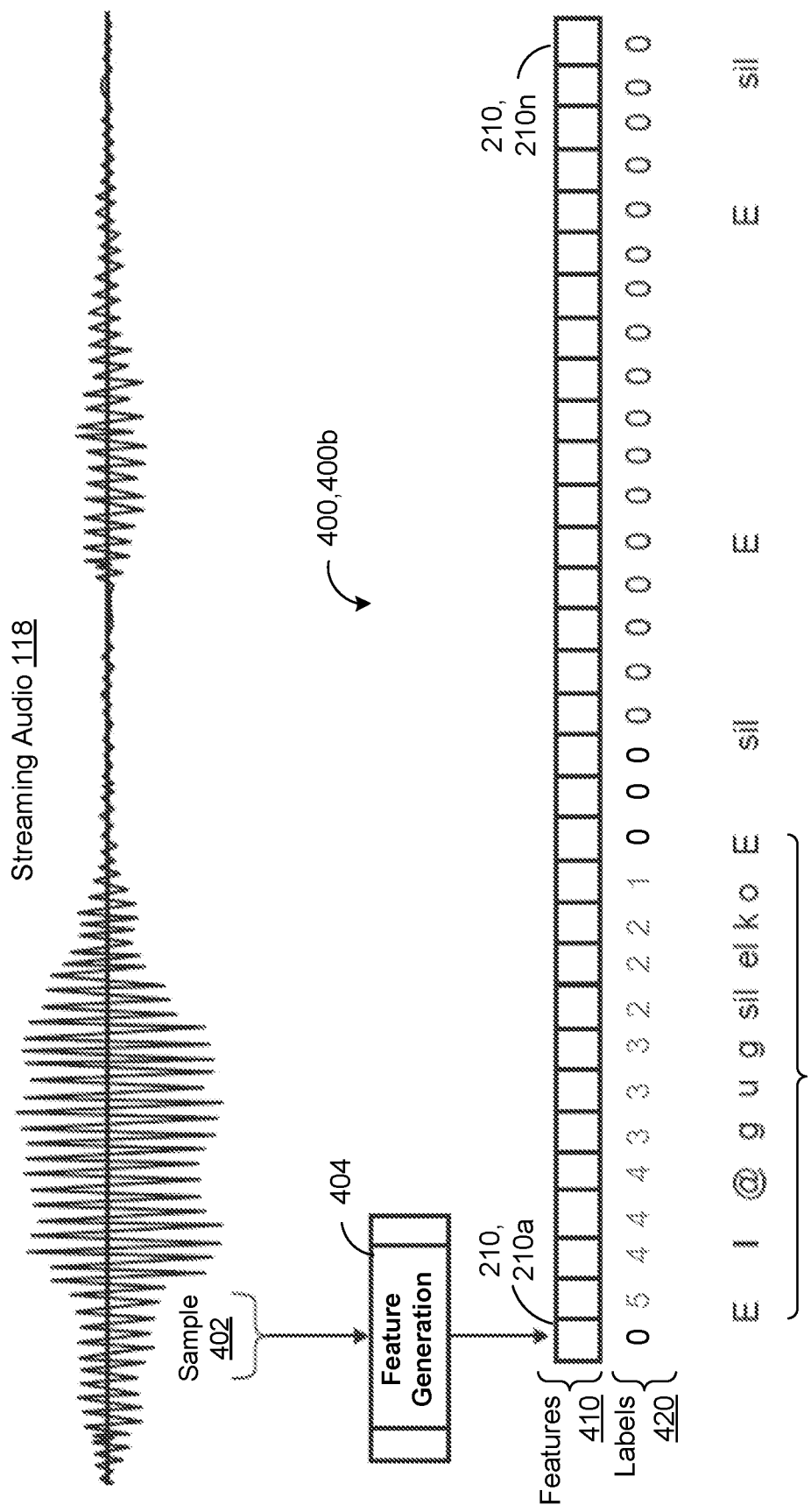

Referring now to FIGS. 4A and 4B, in some implementations, the memorized neural network 300 is trained on a plurality of training input audio sequences 400 (i.e., training samples) that each include a sequence of input frames 210, 210a-n and labels 420 assigned to the input frames 210. Each input frame 210 includes one or more respective audio features 410 characterizing phonetic components 430 of a hotword, and each label 420 indicates a probability that the one or more audio features 410 of a respective input frame 210 include a phonetic component 430 of the hotword. In some examples, the audio features 410 for each input frame 210 are converted from raw audio signals 402 of an audio stream 118 during a pre-processing stage 404. The audio features 410 may include one or more log-filterbanks. Thus, the pre-processing stage may segment the audio stream 118 (or spoken utterance 120) into the sequence of input frames 210 (e.g., 30 ms each), and generate separate log-filterbanks for each frame 210. For example, each frame 210 may be represented by forty log-filterbanks. Moreover, each successive SVDF layer 302 receives, as input, the filtered audio features 410 with respect to time that are output from the immediately preceding SVDF layer 302.

In the example shown, each training input audio sequence 400 is associated with a training sample that includes an annotated utterance containing a designated hotword occurring within a fixed length of time (e.g., two seconds). The memorized neural network 300 may also optionally be trained on annotated utterances 400 that do not include the designated hotword, or include the designated hotword but spanning a time longer than the fixed length of time, and thus, would not be falsely detected due to the fixed memory forgetting data outside the fixed length of time. In some examples, the fixed length of time corresponds to an amount of time that a typical speaker would take to speak the designated hotword to summon a user device 102 for processing spoken queries and/or voice commands. For instance, if the designated hotword includes the phrase "Hey Google" or "Ok Google", a fixed length of time set equal to two seconds is likely sufficient since even a slow speaker would generally not take more than two seconds to speak the designated phrase. Accordingly, since it is only important to detect the occurrence of the designated hotword within streaming audio 118 during the fixed length of time, the neural network 300 includes an amount of fixed memory that is proportional to the amount of audio to span the fixed time (e.g., two seconds). Thus, the fixed memory of the neural network 300 allows neurons 312 of the neural network to filter audio features 410 (e.g., log-filterbanks) from one input frame 210 (e.g., 30 ms time window) of the streaming audio 118 at a time, while storing the most recent filtered audio features 410 spanning the fixed length of time and removing or deleting any filtered audio features 410 outside the fixed length of time from a current filtering iteration. Thus, if the neural network 300 has, for example, a memory depth of thirty-two (32), the first thirty-two (32) frames processed by the neural network 300 will fill the memory component 330 to capacity, and for each new output after the first 32, the neural network 300 will remove the oldest processed audio feature from the corresponding memory location 332 of the memory component 330.

Referring to FIG. 4A, for end-to-end training, training input audio sequence 400a includes labels 420 that may be applied to each input frame 210. In some examples, when a training sample 400a contains the hotword, a target label 420 associated with a target score (e.g., '1') is applied to one or more input frames 210 that contain audio features 410 characterizing phonetic components 430 at or near the end of the hotword. For example, if the phonetic components 430 of the hotword "OK Google" are broken into: "ou", 'k', "el", "<silence>", 'g', 'u', 'g', '@', 'l', then target labels of the number '1' are applied to all input frames 210 that correspond to the letter 'l' (i.e. the last component 430 of the hotword), which are part of the required sequence of phonetic components 430 of the hotword. In this scenario, all other input frames 210 (not associated with the last phonetic component 430) are assigned a different label (e.g., '0'). Thus, each input frame 210 includes a corresponding input feature-label pair 410, 420. The input features 410 are typically one-dimensional tensors corresponding to, for example, mel filterbanks or log-filterbanks, computed from the input audio over the input frame 210. The labels 420 are generated from the annotated utterances 400a, where each input feature tensor 410 is assigned a phonetic class via a force-alignment step (i.e., a label of '1' is given to pairs corresponding to the last class belonging to the hotword, and '0' to all the rest). Thus, the training input audio sequence 400a includes binary labels assigned to the sequence of input frames. The annotated utterances 400a, or training input audio sequence 400a, correspond to the training samples 400 obtained from the annotated utterance pools 130 of FIG. 1.

In another implementation, FIG. 4B includes a training input audio sequence 400b that includes labels 420 associated with scores that increase along the sequence of input frames 210 as the number of audio features 410 characterizing (matching) phonetic components 430 of the hotword progresses. For instance, when the hotword includes "Ok Google", the input frames 210 that include respective audio features 410 that characterize the first phonetic components, 'o' and 'k', have assigned labels 420 of '1', while the input frames 210 that include respective audio features 410 characterizing the final phonetic component of 'l' have assigned labels 420 of '5'. The input frames 210 including respective audio features 410 characterizing the middle phonetic components 430 have assigned labels 420 of '2', '3', and '4'.

In additional implementations, the number of positive labels 420 increases. For example, a fixed amount of '1' labels 420 is generated, starting from the first frame 210 including audio features 410 characterizing to the final phonetic component 430 of the hotword. In this implementation, when the configured number of positive labels 420 (e.g., '1') is large, a positive label 420 may be applied to frames 210 that otherwise would have been applied a non-positive label 420 (e.g., '0'). In other examples, the start position of the positive label 420 is modified. For example, the label 420 may be shifted to start at either a start, mid-point, or end of a segment of frames 210 containing the final keyword phonetic component 430. Still yet in other examples, a weight loss is associated with the input sequence. For example, weight loss data is added to the input sequence that allows the training procedure to reduce the loss (i.e. error gradient) caused by small mis-alignment. Specifically, with frame-based loss functions, a loss can be caused from either mis-classification or mis-alignment. To reduce the loss, the neural network 300 predicts both the correct label 420 and correct position (timing) of the label 420. Even if the network 300 detected the keyword at some point, the result can be considered an error if it's not perfectly aligned with the given target label 420. Thus, weighing the loss is particularly useful for frames 210 with high likelihood of mis-alignment during the force-alignment stage.

Figure 5A:
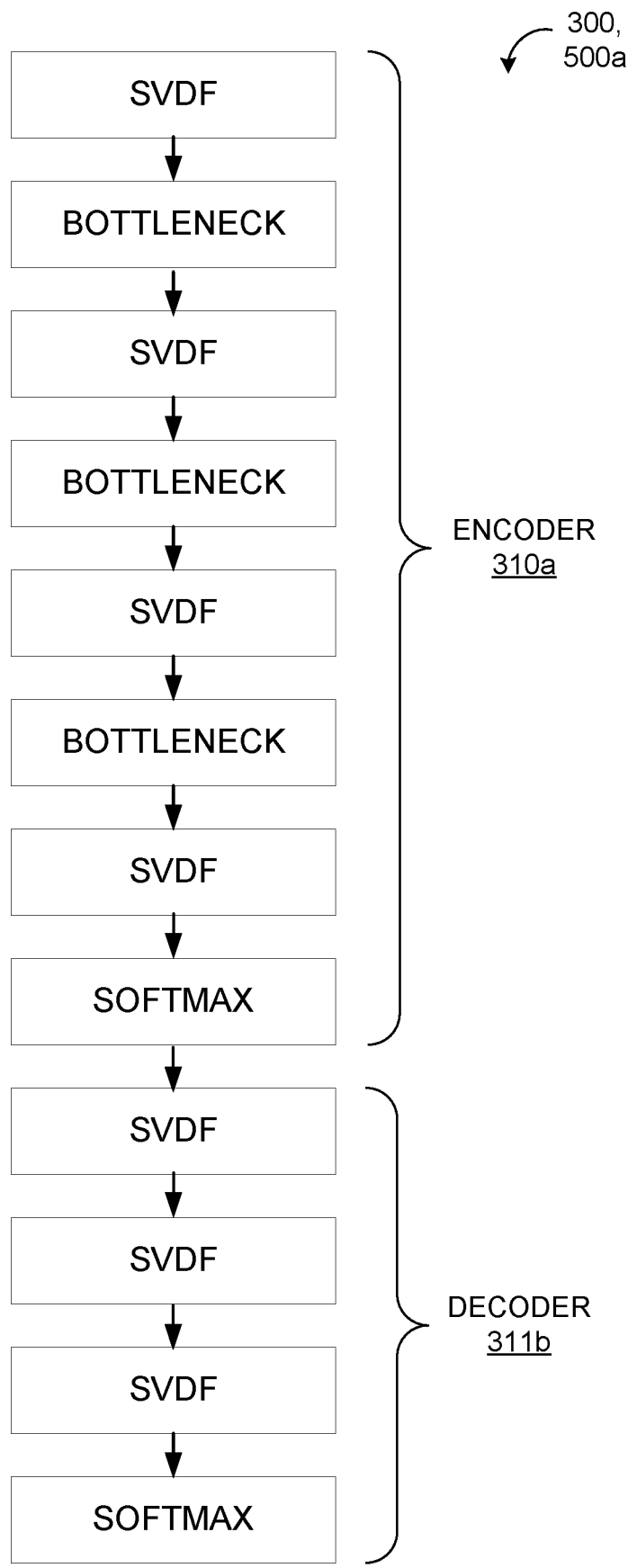
FIGS. 5A and 5B are schematic views of layers of the memorized neural network of the system of FIG. 1.

As a result of training using either of the training input audio sequences 400a, 400b of FIGS. 4A and 4B, the neural network 300 is optimized (typically using cross-entropy (CE) loss) to output binary decision labels 420 indicating whether the hotword(s) are present in the streaming audio 118. In some examples, network 300 is trained in two stages. Referring now to FIG. 5A, schematic view 500a shows an encoder portion (or simply 'encoder') 310a of the neural network 300 that includes, for example, eight layers, that are trained individually to produce acoustic posterior probabilities. In addition to the SVDF layers, the network 300 may, for example, include bottleneck, softmax, and/or other layers. For training the encoder 310a, label generation assigns distinct classes to all the phonetic components of the hotword (plus silence and "epsilon" targets for all that is not the hotword). Then, the decoder portion (or simply 'decoder') 311a of the neural network 300 is trained by creating a topology where the first part (i.e. the layers and connections) matches that of the encoder 310a, and a selected checkpoint from that encoder 310a of the neural network 300 is used to initialize it. The training is specified to "freeze" (i.e. not update) the parameters of the encoder 310a, thus tuning just the decoder 311a portion of the topology. This naturally produces a single spotter neural network, even though it is the product of two staggered training pipelines. Training with this method is particularly useful on models that tend to present overfitting to parts of the training set.

Figure 5B:
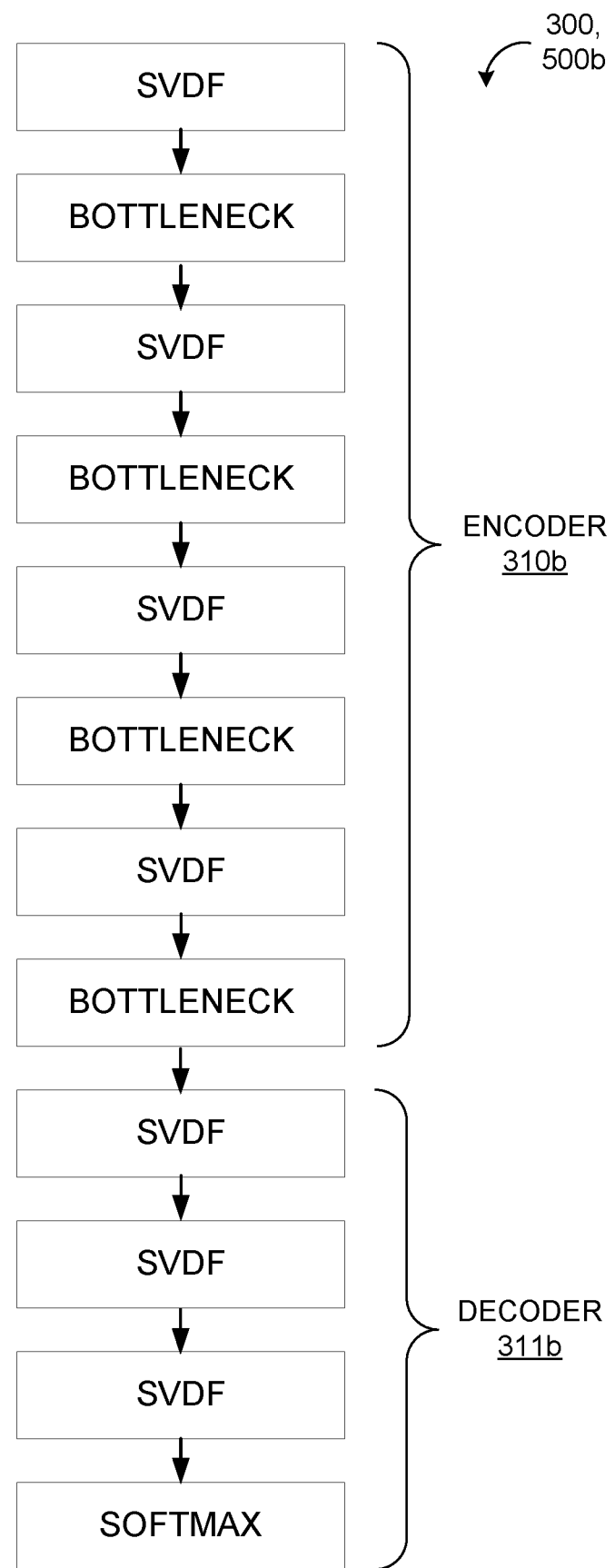

Alternatively, the neural network 300 is trained end-to-end from the start. For example, the neural network 300 accepts features directly (similarly to the encoder 310a training described previously), but instead uses the binary target label 420 (i.e., '0' or '1') outputs for use in training the decoder 311a. Such an end-to-end neural network 300 may use any topology. For example, as shown in FIG. 5B, schematic view 500b shows a neural network 300 topology of an encoder 310b and a decoder 311b that is similar to the topology of FIG. 5A except that the encoder 310b does not include the intermediate softmax layer. As with the topology of FIG. 5A, the topology of FIG. 5B may use a pre-trained encoder checkpoint with an adaptation rate to tune how the decoder 311b part is adjusted (e.g. if the adaptation rate is set to 0, it is equivalent to the FIG. 5A topology). This end-to-end pipeline, where the entirety of the topology's parameters are adjusted, tends to outperform the separately trained encoder 310a and decoder 311a of FIG. 5A, particularly in smaller sized models which do not tend to overfit.

Thus, neural network 300 avoids the use of a manually tuned decoder. Manual tuning the decoder increases the difficulty in changing or adding hotwords. The single memorized neural network 300 can be trained to detect multiple different hotwords, as well as the same hotword across two or more locales. Further, detection quality reduces compared to a network optimized specifically for hotword detection trained with potentially millions of examples. Further, typical manually tuned decoders are more complicated than a single neural network that performs both encoding and decoding. Traditional systems tend to be overparameterized, consuming significantly more memory and computation than a comparable end-to-end model and they are unable to leverage as much neural network acceleration hardware. Additionally, a manual tuned decoder suffers from accented utterances, and makes it extremely difficult to create detectors that can work across multiple locales and/or languages.

The memorized neural network 300 outperforms simple fully-connected layers of the same size, but also benefits from optionally initializing parameters from a pre-trained fully connected layer. The network 300 allows fine grained control over how much to remember from the past. This results in outperforming RNN-LSTMs for certain tasks that do not benefit (and actually are hurt) from paying attention to theoretically infinite past (e.g. continuously listening to streaming audio). However, network 300 can work in tandem with RNN-LSTMs, typically leveraging SVDF for the lower layers, filtering the noisy low-level feature past, and LSTM for the higher layers. The number of parameters and computation are finely controlled, given that several relatively small filters comprise the SVDF. This is useful when selecting a tradeoff between quality and size/computation. Moreover, because of this quality, network 300 allows creating very small networks that outperform other topologies like simple convolutional neural networks (CNNs) which operate at a larger granularity.

Figure 6:
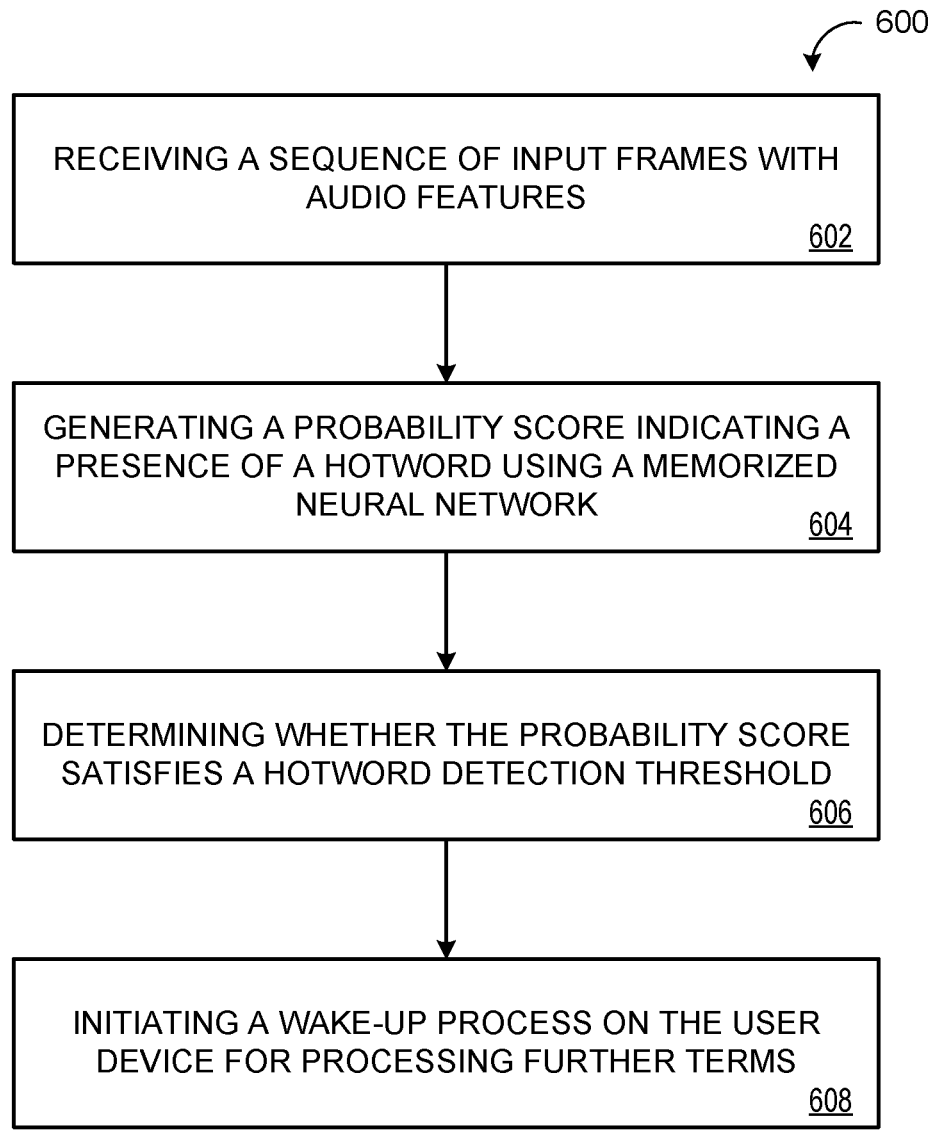
FIG. 6 is a flowchart of an example arrangement of operations for a method of detecting a hotword in streaming audio.

FIG. 6 is a flowchart of an example arrangement of operations for a method 600 of detecting a hotword in streaming audio 118. The flowchart start at operation 602 by receiving, at data processing hardware 103 of a user device 102, a sequence of input frames 210 that each include respective audio features 410 characterizing streaming audio 118 captured by the user device 102. The audio features 410 of each input frame 210 may include log-filterbanks. For example, each input frame 210 may include forty log-filterbanks. At operation 604, the method 600 includes generating, by the data processing hardware 103, a probability score 350 indicating a presence of a hotword in the streaming audio 118 using a memorized neural network 300 including sequentially-stacked SVDF layers 302, wherein each SVDF layer 302 includes at least one neuron 312, and each neuron 312 includes a respective memory component 330, the respective memory component 330 associated with a respective memory capacity of the corresponding neuron 312. Each neuron 312 also includes a first stage 320 and a second stage 340. The first stage 320 is configured to perform filtering on audio features 410 of each input frame 210 individually and output the filtered audio features 410 to the respective memory component 330. The second stage 340 is configured to perform filtering on all the filtered audio features 410 residing in the respective memory component 330. The neural network 300 may include at least one additional processing layer disposed between adjacent SVDF layers 302. The neural network 300, in some examples, includes at least one bottlenecking layer disposed between adjacent SVDF layers 302. Bottleneck layers are used to significantly reduce the parameter count between layers.

In some examples, a sum of the memory capacities associated with the respective memory components 330 for a neuron 312 from each of the SVDF layers 302 provide the neural network 300 with a fixed memory capacity proportional to a length of time a typical speaker takes to speak the hotword. The respective memory capacity associated with at least one of the respective memory components 330 may be different than the respective memory capacities associated with the remaining memory components 330. Alternatively, the respective memory capacities associated with the respective memory components 330 of the neurons 312 of all the SVDF layers 302 is the same.

At operation 606, the method 600 includes determining, by the data processing hardware 103, whether the probability score 350 satisfies a hotword detection threshold. When the probability score 350 satisfies the hotword detection threshold, the method 600 includes, at operation 608, initiating, by the data processing hardware 103, a wake-up process on the user device 102 for processing the hotword and/or one or more other terms following the hotword in the audio stream 118.

In some implementations, a remote system 110 having computing resources 112 and memory resources 113 is configured to train the neural network 300 on a plurality of training input sequences 400, each training input audio sequence 400 including a sequence of input frames 210 that each include one or more respective audio features 410 characterizing phonetic components 430 of the hotword. Each training input audio sequence 400 also includes labels 420 assigned to the input frames 210, each label 420 indicating a probability that the audio features 410 of a respective input frame 210 include a phonetic component 430 of the hotword. In additional examples, training the neural network 300 includes, for each training input audio sequence 400, training an encoder portion 310b by assigning a first label 420 to a portion of the input frames 210 that include a phonetic component 430 of the hotword. The training also includes assigning a second label 420 to a remaining portion of the input frames 210 that includes phonetic components 430 of the hotword and training a decoder portion 311b by applying a label 420 indicating that the corresponding training input audio sequence 400 either includes the hotword or does not include the hotword. Assigning the first label 420 to the portion of the input frames 210 may include assigning the first label 420 to at least one input frame 210 that includes one or more respective audio features 410 characterizing a last phonetic component 430 of the hotword and assigning the second labels 420 to the remaining input frames 210 each including one or more respective audio features 410 characterizing the remaining phonetic components of the hotword.

In some implementations, the method 600 includes training the neural network 300 by, during a first stage 320 of training, pre-training an encoder portion 310a by assigning the labels 420 to the input frames 210 for the corresponding training input audio sequence 400. During a second stage 340 of training, the method 600 includes initializing the encoder portion 310a with the assigned labels 420 from the first stage of training and training a decoder portion 311a with outputs from the encoder portion 310 to either detect the hotword or not detect the hotword.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 7:
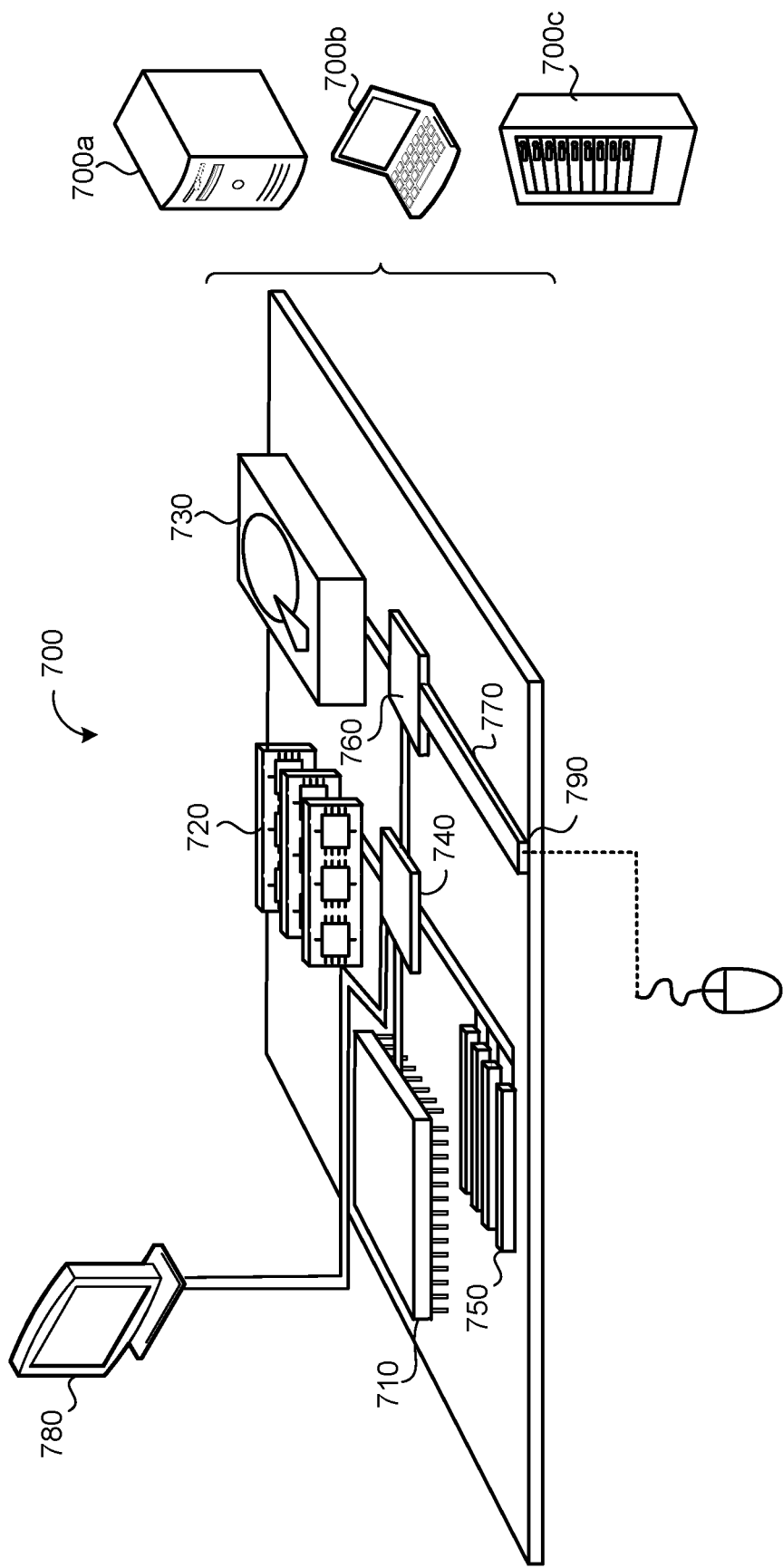
FIG. 7 is a schematic view of an example computing device that may be used to implement the systems and methods described herein.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 770 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 370a. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 720, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 370 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware of a user device, a sequence of input frames that each include respective audio features characterizing streaming audio captured by the user device;
generating, by the data processing hardware, a probability score indicating a presence of a hotword in the streaming audio using a memorized neural network, the memorized neural network comprising sequentially-stacked single value decomposition filter (SVDF) layers, wherein each SVDF layer comprises at least one neuron, and each neuron comprises:
a respective memory component, the respective memory component associated with a respective memory capacity of the corresponding neuron;
a first stage configured to perform filtering on the respective audio features of each input frame individually and output the filtered audio features to the respective memory component; and
a second stage configured to perform filtering on all the filtered audio features residing in the respective memory component;
determining, by the data processing hardware, whether the probability score satisfies a hotword detection threshold; and
when the probability score satisfies the hotword detection threshold, initiating, by the data processing hardware, a wake-up process on the user device for processing the hotword and/or one or more other terms following the hotword in the audio stream.

2. The method of claim 1, wherein a sum of the memory capacities associated with the respective memory components for a neuron from each of the SVDF layers provide the memorized neural network with a fixed memory capacity proportional to a length of time a typical speaker takes to speak the hotword.

3. The method of claim 1, wherein the respective memory capacity associated with at least one of the respective memory components is different than the respective memory capacities associated with the remaining memory components.

4. The method of claim 1, wherein the respective memory capacities associated with the respective memory components of all the SVDF layers is the same.

5. The method of claim 1, wherein a remote system trains the memorized neural network on a plurality of training input audio sequences, each training input audio sequence comprising:
a sequence of input frames that each include one or more respective audio features characterizing phonetic components of the hotword; and
labels assigned to the input frames, each label indicating a probability that the audio features of a respective input frame include a phonetic component of the hotword.

6. The method of claim 5, wherein training the memorized neural network comprises, for each training input audio sequence:
training an encoder portion by assigning a first label to a portion of the input frames that include a phonetic component of the hotword and assigning a second label to a remaining portion of the input frames that include phonetic components of the hotword; and
training a decoder portion by applying a label indicating that the corresponding training input audio sequence either includes the hotword or does not include the hotword.

7. The method of claim 6 wherein assigning the first label to the portion of the input frames comprises:
assigning the first label to at least one input frame that includes one or more respective audio features characterizing a last phonetic component of the hotword; and
assigning the second label to the remaining input frames each including one or more respective audio features characterizing the remaining phonetic components of the hotword.

8. The method of claim 5, wherein training the neural network comprises, for each training input audio sequence:
during a first stage of training, pre-training an encoder portion by assigning the labels to the input frames for the corresponding training input audio sequence; and
during a second stage of training:
initializing the encoder portion with the assigned labels from the first stage of training; and
training a decoder portion with outputs from the encoder portion to either detect the hotword or not detect the hotword.

9. The method of claim 1, wherein the memorized neural network comprises at least one additional processing layer disposed between adjacent SVDF layers.

10. The method of claim 1, wherein the memorized neural network comprises at least one bottlenecking layer disposed between adjacent SVDF layers.

11. The method of claim 1, wherein the audio features of each input frame comprise log-filterbanks.

12. The method of claim 11, wherein each input frame comprises forty log-filterbanks.

13. A system comprising:
data processing hardware of a user device; and
memory hardware in communication with the data processing hardware, the memory hardware storing instructions that when executed on the data processing hardware cause the data processing hardware to perform operations comprising:
receiving a sequence of input frames that each include respective audio features characterizing streaming audio captured by the user device;
generating a probability score indicating a presence of a hotword in the streaming audio using a memorized neural network, the memorized neural network comprising sequentially-stacked single value decomposition filter (SVDF) layers, wherein each SVDF layer comprises at least one neuron, and each neuron comprises:
a respective memory component, the respective memory component associated with a respective memory capacity of the corresponding neuron;
a first stage configured to perform filtering on the respective audio features of each input frame individually and output the filtered audio features to the respective memory component; and
a second stage configured to perform filtering on all the filtered audio features residing in the respective memory component;
determining whether the probability score satisfies a hotword detection threshold; and
when the probability score satisfies the hotword detection threshold, initiating a wake-up process on the user device for processing the hotword and/or one or more other terms following the hotword in the audio stream.

14. The system of claim 13, wherein a sum of the memory capacities associated with the respective memory components for a neuron from each of the SVDF layers provide the memorized neural network with a fixed memory capacity proportional to a length of time a typical speaker takes to speak the hotword.

15. The system of claim 13, wherein the respective memory capacity associated with at least one of the respective memory components is different than the respective memory capacities associated with the remaining memory components.

16. The system of claim 13, wherein the respective memory capacities associated with the respective memory components of all the SVDF layers is the same.

17. The system of claim 13, wherein a remote system is configured to train the memorized neural network on a plurality of training input audio sequences, each training input audio sequence comprising:
   a sequence of input frames that each include one or more respective audio features characterizing phonetic components of the hotword; and
   labels assigned to the input frames, each label indicating a probability that the audio features of a respective input frame include a phonetic component of the hotword.

18. The system of claim 17, wherein training the memorized neural network comprises, for each training input audio sequence:
   training an encoder portion by assigning a first label to a portion of the input frames that include a phonetic component of the hotword and assigning a second label to a remaining portion of the input frames that include phonetic components of the hotword; and
   training a decoder portion by applying a label indicating that the corresponding training input audio sequence either includes the hotword or does not include the hotword.

19. The system of claim 18, wherein assigning the first label to the portion of the input frames comprises:
   assigning the first label to at least one input frame that includes one or more respective audio features characterizing a last phonetic component of the hotword; and
   assigning the second label to the remaining input frames each including one or more respective audio features characterizing the remaining phonetic components of the hotword.

20. The system of claim 17, wherein training the memorized neural network comprises, for each training input audio sequence:
   during a first stage of training, pre-training an encoder portion by assigning the labels to the input frames for the corresponding training input audio sequence; and
   during a second stage of training:
      initializing the encoder portion with the assigned labels from the first stage of training; and
      training a decoder portion with outputs from the encoder portion to either detect the hotword or not detect the hotword.

21. The system of claim 13, wherein the memorized neural network comprises at least one additional processing layer disposed between adjacent SVDF layers.

22. The system of claim 13, wherein the memorized neural network comprises at least one bottlenecking layer disposed between adjacent SVDF layers.

23. The system of claim 13, wherein the audio features of each input frame comprise log-filterbanks.

24. The system of claim 23, wherein each input frame comprises forty log-filterbanks.

\* \* \* \* \*